United States Patent [19]

Kawarabayashi

[11] Patent Number: 5,153,921
[45] Date of Patent: Oct. 6, 1992

[54] MICROCOMPUTER

[75] Inventor: Takashi Kawarabayashi, Hyogo, Japan

[73] Assignee: Mitsubishi Denki Kabushiki Kaisha, Japan

[21] Appl. No.: 756,002

[22] Filed: Sep. 6, 1991

[30] Foreign Application Priority Data

Oct. 9, 1990 [JP] Japan ................................ 2-271255

[51] Int. Cl.[5] .............................................. H04K 1/00
[52] U.S. Cl. ............................................ 380/49; 380/4
[58] Field of Search ........................................ 380/4, 49

[56] References Cited

U.S. PATENT DOCUMENTS 4,823,308  4/1989  Knight ................................. 380/49
4,905,277  2/1990  Nakamura ........................... 380/49
5,007,082  4/1991  Cummins ............................. 380/4

Primary Examiner—Salvatore Cangialosi
Attorney, Agent, or Firm—Townsend and Townsend

[57] ABSTRACT

A microcomputer according to this invention which incorporates a bus switching circuit disposed between the ALU unit and memory unit, and the input/output unit, which carries out switching of the order of bit string and encryption of data and programs based on instructions from the ALU unit 2 or data or programs from the memory units 5 and 7. Encrypted data or programs are output to the outside of the microcomputer via the input/output unit 6, while the said encrypted data or programs that are input from the outside of the microcomputer are decoded and sent to the ALU unit 2 or the memory units 5 and 7.

4 Claims, 4 Drawing Sheets $$I_1 = \begin{pmatrix} 1 & & & & & & & \\ 0 & 1 & & & & & & \\ 0 & & 1 & & & & & \\ 0 & & & 1 & & & & \\ 0 & & & & 1 & & & \\ 0 & & & & & 1 & & \\ 0 & & & & & & 1 & \\ 0 & 0 & 0 & 0 & 0 & 0 & 0 & 1 \end{pmatrix} \cdot O_1$$

← LINE

↑ COLUMN ns 5 and 7,
is positioned between the ALU unit 2 and memory units
5 and 7, and the input/output unit 6.

The above and other objects, features, and advantages of the Invention will become more apparent from the following description when taken in conjunction with the accompanying drawings.

DESCRIPTION OF THE PREFERRED EMBODIMENT

Figure 1:
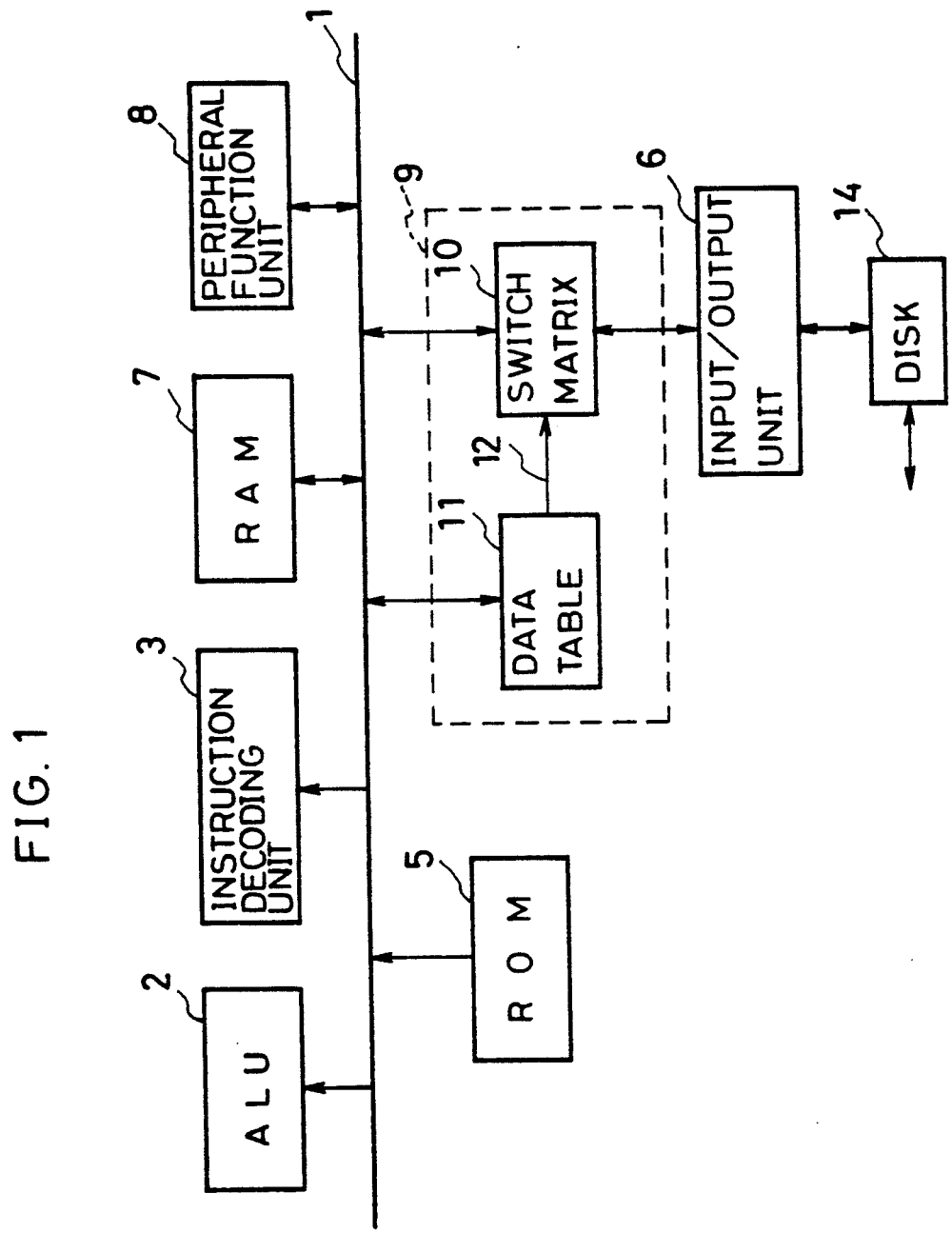
FIG. 1 is a block diagram of a microcomputer according to an embodiment of the invention.

In FIG. 1, 1 is an internal microcomputer bus; 2 an ALU (arithmetic-logic unit); 3 an instruction decoding unit; 5 a ROM for storing programs; 6 an input/output unit for inputting or outputting data between the microcomputer and the outside; 7 a RAM for storing data; 8 a peripheral function unit that includes a timer; and 9 a bus switching circuit situated between the bus 1 and the input/output unit 6. Bus switching circuit 9 is comprised of: the switch matrix 10, which connects in variable combinations n signal lines on the internal bus side and n signal lines on the input/output unit side when the internal bus 1 is comprised of n signal lines; the data table 11 which determines the on/off status of each switch comprising the switch matrix 10; and the signal line 12 which transfers the data in the data table 11 as on/off signals corresponding to each switch in the switch matrix 10. The input/output unit 6 is connected with the disk device 14, which can be accessed also from outside peripherals and the like.

Figure 2:
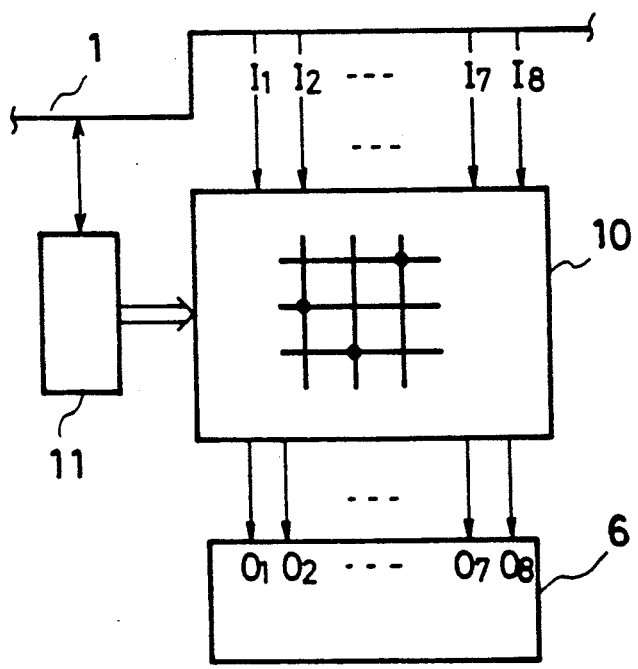
FIG. 2 is a functional block diagram of the switch matrix of the microcomputer of FIG. 1.
Figures 3, 4:
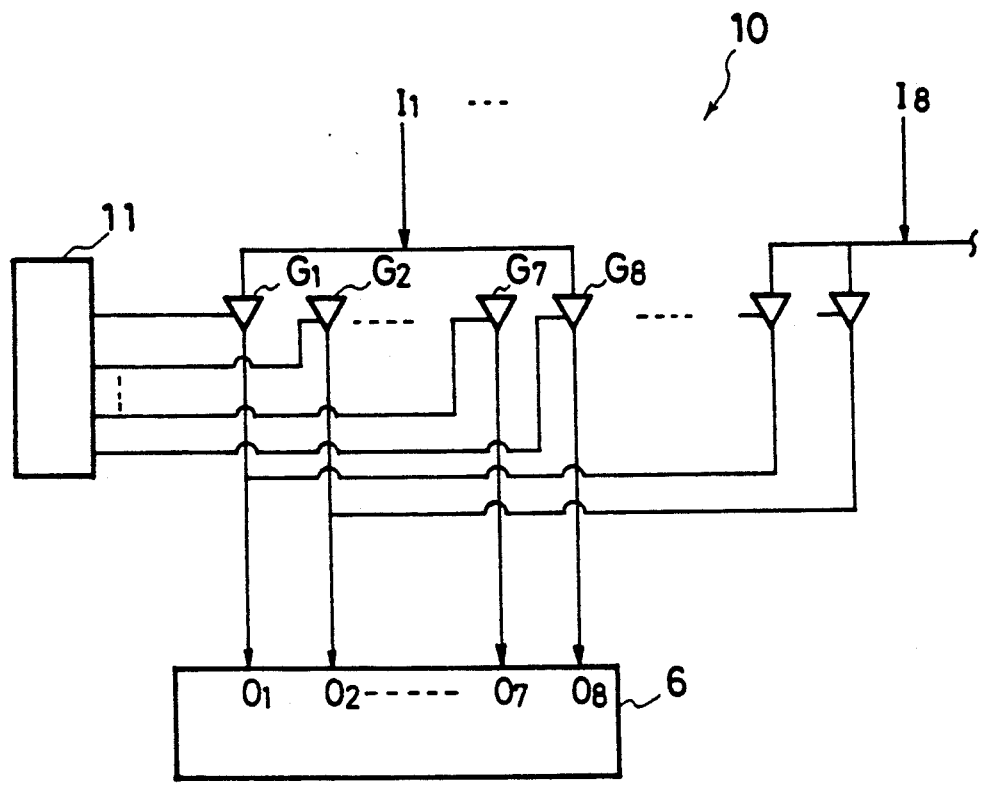
FIG. 3 an example of a circuit pattern of the switch matrix of FIG. 2.
FIG. 4 is an example of the contents of a data table.

A detailed explanation of the switch matrix 10 and the data table 11 is provided next on the basis of FIGS. 2 to 4.

Assuming an 8-bit input/output signal in FIG. 2, the input terminals $1_1$ to $1_8$ are switched by the switch matix 10 and connected to the output terminals $0_1$ to $0_8$ specified by the data table 11. In this way, the data format within the microprocessor and the data format of the outside of to the input/output unit 6 are made different.

The switch matrix 10 is comprised of groups of three-state buffers shown in FIG. 3, with the input terminal $1_1$ of bit 1 connected to each input terminal, $G_1$ to $G_8$, of eight three-state buffers. The output terminal of each three-state buffer is connected to the output terminals $0_1$ to $0_8$, respectively, and each gate is provided with a control signal from the data table 11. Similarly, the input terminal $1_2$ of bit 2 is connected to the next set of 8 three-state buffers, and control is provided by the next eight control signals from the data table 11, and the output side is connected to the output terminals $0_1$ to $0_8$, as in the case of bit 1.

In the same way, bit 3 to bit 8 each have corresponding three-state buffers and each is controlled by signals from the data table 11, but the output side is connected to the same output terminals $0_1$ to $0_8$. In this way, the input terminal $1_1$ of bit 1 is connected to one output

MICROCOMPUTER

BACKGROUND OF THE INVENTION

1. Field of the Invention

The present invention relates to a microcomputer which can be used in communication systems and other data processing systems requiring the protection of secrecy.

2. Description of the Prior Art

Figure 5:
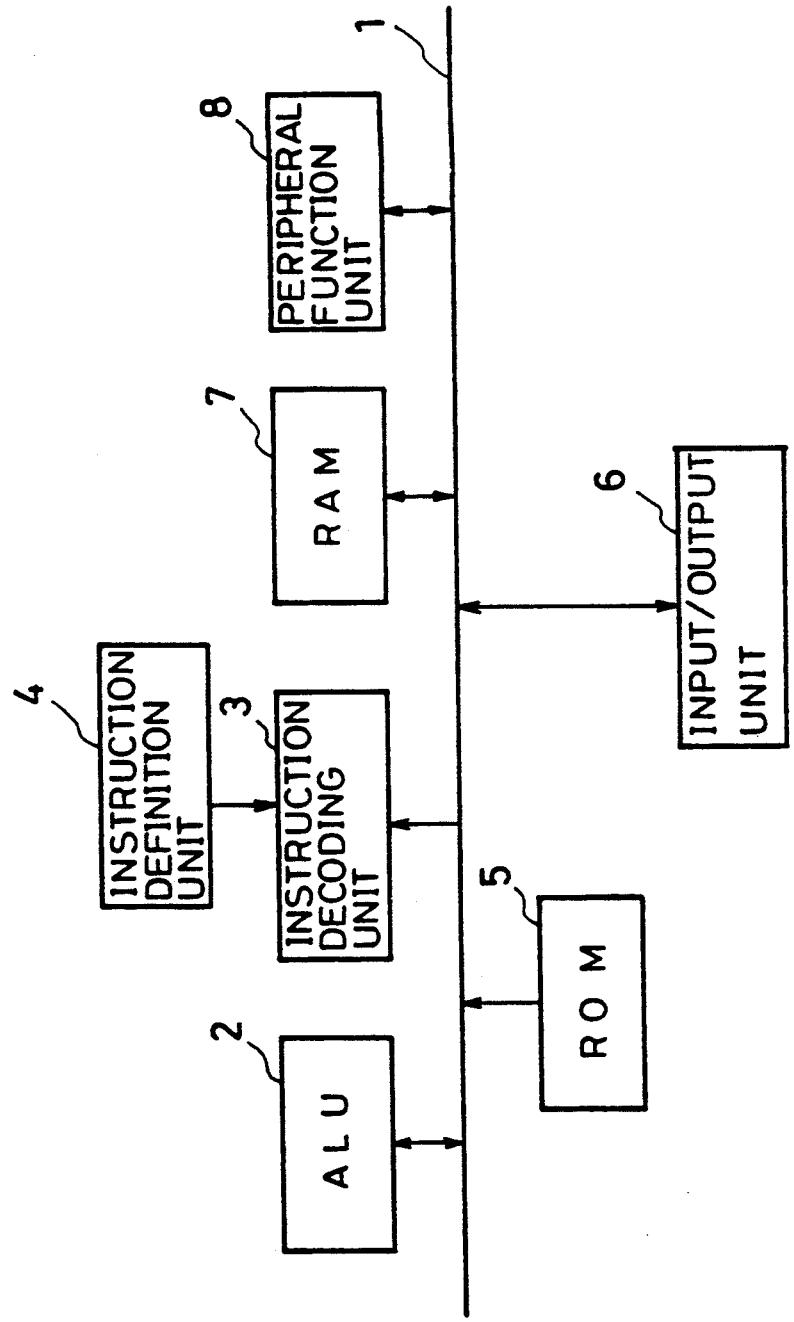
FIG. 5 is a block diagram of a conventional microcomputer.

A conventional microcomputer is shown in FIG. 5. The microcomputer 1 has an internal bus 1; an ALU (arithmetic-logic unit) 2; an instruction decoding unit 3; an instruction definition unit 4 which decodes encryption instructions sent through bus 1 to instruction decoding unit 3; a ROM 5 for storing programs; an input-/output unit 6 for inputting or outputting data between the microcomputer and outside thereof; a RAM 7 for storing programs or data; and a peripheral function unit 8 that includes a timer. Data that have been encrypted by the repositioning of operation code bit strings in a pre-determined order are stored in the ROM 5 and RAM 7. The instruction definition unit 4 stores previously procedures for repositioning the bit strings of instructions for decoding, as a data table.

In operation, an encryption program that has been stored in the ROM 5 or RAM 7, or an encryption program that is provided from the outside of the microcomputer through the input/output unit 6 is sent to the instruction decoding unit 3 through bus 1 a single instruction at a time. The program is then decoded according to the data table stored in the instruction definition unit 4. Thereafter, the program is executed as an original program in the ALU 2.

Since the structure of conventional microcomputers is as described above, the data table used for decoding must be kept secret. It is therefore necessary to make it impossible to read out the contents of the instruction definition unit 4. For this reason, the normal operation of instruction definition unit 4 could be checked only indirectly by actually inputting a program and operating the microcomputer, but no accurate function testing could be conducted. Moreover, data that were input or output between the microcomputer and the outside through the ALU 2, RAM 7, or input/output unit 6 had to be encrypted during the input program stage, which required time and labor. Furthermore, since the encryption of the input program itself was fixed by the hardware of instruction definition unit 4, sophisticated encryption for higher security had involved longer and more difficult programs.

SUMMARY OF THE INVENTION

Accordingly, it is the object of the invention to obtain a microcomputer without the problems described above, whereby the need to input programs that have been made longer or difficult through encryption is eliminated, all programs and data are encrypted as far as the microcomputer is observed from the outside through the input/output unit, and the reading out of the contents of the conversion unit is enabled.

According to the invention there is provided a microcomputer which includes an ALU unit 2 which processes data and programs; memory units 5 and 7 for storing data and programs; and an input/output unit 6 for the transfer through a bus of the said stored data and programs between the microcomputer and the outside, and in which the bus switching circuit 9, which enterminal among the eight output terminals $0_1$ to $0_8$ so that one of the buffers among the eight three-state buffers $G_1$ to $G_8$ is turned on. In the matrix in FIG. 4, the signal that connects the input terminal $1_1$ of bit 1 to one of the output terminals $0_1$ to $0_8$ corresponds to data in column 1, while that for bit 2 corresponds to data in column 2, and so on up to bit 8, which corresponds to data in column 8. In each column, only one element is "1." Data table 11 is set up in such a way that "1" appears only in mutually different lines. The "1" element turns on only the three-state buffer to which it is applied as a gate signal.

These matrix data are pre-stored in the data table 11 through instructions from the ROM 5.

Persons with prior knowledge of the matrix data would be able to decode encrypted programs and data read out from the input/output unit 6 even at the outside of the microcomputer.

In operation, the switch matrix 10 turns off when the microcomputer is reset. In other words, all elements in the matrix shown in FIG. 4 are changed to "0" by an instruction from the ALU 2, and all three-state buffers turn off. At this time, data on the internal bus 1 cannot be output through the input/output unit 6 and thus observation of the microcomputer is not possible. In this state, a program stored in the ROM 5, which contains a set of matrix data, sets the matrix data into the data table 11. When all data have been set, each switch comprising the switch matrix 10 is turned on or off by signal line 12. This causes the internal bus 1 to become connectable with the outside via the bus switching circuit 9 and the input/output unit 6. In this way, programs and data, the data format of which are in unencrypted form within the microcomputer, are outputted as signals encrypted with another format by the bus switching circuit 9 when tried to read out once to the outside. In addition, when encrypted programs or data that have been read out are input from the outside, they are automatically decoded when they pass through the bus switching circuit. The setting condition of the data table 11 at this time is identical to the setting condition at the time of encryption.

In this embodiment of the invention, the encryption program stored in the ROM 5 or data for encryption stored in the data table 11 can also be encrypted by passing through the bus switching circuit 9 and output to the external disk 14. For this reason, there is no need for the creation of a read out-disabled area.

In this event, if the encryption program in the ROM 5 has been stored securely, it can be used to decode encrypted data or programs that have been read out whenever necessary.

In the above embodiment of the invention, the ROM 5 has been indicated as being built in; however, if the data table 11 is determined uniquely when the microcomputer is reset, causing the switch matrix 10 to turn on, the ROM 5 may be eliminated.

Furthermore, in the above embodiment of the invention, the circuit for switching all signal lines from $1_1$ to $1_8$ which comprise the bus has been explained; however, the same effect as the above embodiment can be obtained with a circuit that performs partial switching; i.e., signal lines $1_1$ to $1_3$ only.

In addition, in regards the setting of data in the data table 11, the random number generation function of the ALU 2 may be applied to determine the matrix data of FIG. 4 using random numbers. In this case, an outputted encryption program would not be decodable at the outside of the microprocessor.

Moreover, since it is possible to set the data of the data table 11 (i.e., to freely set the encryption format), or to modify each set of data or task program processed by the ALU 2, it becomes almost impossible for a third party to output and decipher the processing contents.

As explained above, the microcomputer according to the invention is provided with a bus switching circuit that is situated between the ALU unit, memory unit, and input/output unit which carries out encryption of data and programs based on instructions from the ALU unit or data stored in the memory unit. This eliminates the need for the input of encryption programs or data, while allowing the contents of the bus switching circuit that carries out encryption to be read out to the outside of the microcomputer.

Furthermore, all programs providing original functions and data can be encrypted, and the encryption format can be freely set.

What is claimed is:

1. A microcomputer comprising:
   an internal bus;
   an ALU coupled to said internal bus;
   a memory coupled to said internal bus;
   an input/output unit for transferring data and programs between said internal bus and a bus external to the microcomputer; and
   a bus switching circuit, disposed between said internal bus and said input/output unit, that encrypts said data and programs and including:
   (a) a matrix of switches configured according to instructions from said ALU unit and data stored in said memory unit;
   (b) said matrix having a first set of parallel signal lines coupled to said internal bus and a second set of parallel signal lines coupled to said input/output unit; and
   (c) said matrix establishing a given combination of connections between said first set of parallel signal lines and said second set of parallel signal lines according to an on/off state of each of said switches.

2. The microcomputer according to claim 1 wherein the bus switching circuit further comprises:
   a data table which sets encryption data that determines the on/off state of each switch of said matrix; and signal lines, coupled to said data table and to said matrix, for transferring control signals to configure said switches based on said encryption data.

3. The microcomputer according to claim 1 wherein the switch matrix is comprised of three-state buffers.

4. The microcomputer according to claim 1 wherein the encryption program for setting encryption data in said data table is stored in a ROM that is used as said memory unit.

* * * * *